(12) United States Patent
Seo et al.

(10) Patent No.: US 10,623,291 B2
(45) Date of Patent: Apr. 14, 2020

(54) OPERATION METHOD OF COMMUNICATION NODE FOR DETECTING LINK ERRORS IN NETWORK

(71) Applicants: HYUNDAI MOTOR COMPANY, Seoul (KR); KIA MOTORS CORPORATION, Seoul (KR)

(72) Inventors: Kang Woon Seo, Seoul (KR); Dong Ok Kim, Goyang-si (KR); Jin Hwa Yun, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 69 days.

(21) Appl. No.: 15/626,669

(22) Filed: Jun. 19, 2017

(65) Prior Publication Data

US 2017/0366430 A1    Dec. 21, 2017

(30) Foreign Application Priority Data

Jun. 20, 2016   (KR) .......................... 10-2016-0076655
May 10, 2017   (KR) .......................... 10-2017-0057983

(51) Int. Cl.
*H04L 12/26*     (2006.01)
*H04J 3/06*      (2006.01)
*H04L 12/24*     (2006.01)

(52) U.S. Cl.
CPC .......... *H04L 43/0847* (2013.01); *H04J 3/065* (2013.01); *H04J 3/0638* (2013.01); *H04L 43/0852* (2013.01); *H04L 41/0659* (2013.01); *H04L 43/0811* (2013.01); *H04L 43/10* (2013.01)

(58) Field of Classification Search
CPC ........ H04J 3/0638; H04J 3/065; H04J 3/0667; H04N 21/242
See application file for complete search history.

(56) References Cited

U.S. PATENT DOCUMENTS

| | | | |
|---|---|---|---|
| 9,277,256 B2* | 3/2016 | Danielsson | H04J 3/0638 |
| 2008/0159258 A1* | 7/2008 | Ji | H04B 7/2696 |
| | | | 370/350 |
| 2017/0366430 A1* | 12/2017 | Seo | H04L 43/0852 |

* cited by examiner

*Primary Examiner* — Raj Jain
(74) *Attorney, Agent, or Firm* — Morgan, Lewis & Bockius LLP

(57) ABSTRACT

An operation method of a first communication node in an Ethernet-based vehicle network includes identifying a link status between the first communication node and each of a plurality of communication nodes included in the vehicle network; receiving a first frame from a second communication node whose link status is normal among the plurality of communication nodes; identifying a first time difference between a local time of the first communication node and a time stamp of the first frame; and determining a synchronization error between the first communication node and the second communication node based on the first time difference.

14 Claims, 9 Drawing Sheets

OPERATION METHOD OF COMMUNICATION NODE FOR DETECTING LINK ERRORS IN NETWORK

CROSS-REFERENCE TO RELATED APPLICATIONS

This application is based on and claims the benefit of priority to Korean Patent Applications No. 10-2016-0076655 filed on Jun. 20, 2016 and No. 10-2017-0057983 filed on May 10, 2017 with the Korean Intellectual Property Office (KIPO), the entirety of which is incorporated herein by reference.

TECHNICAL FIELD

The present disclosure relates to operation methods of a communication node for detecting a link error or failure in a vehicle network, and more specifically, to operation methods of a communication node for detecting a link error or failure in a system using Ethernet switches in an Ethernet-based vehicle network.

BACKGROUND

Electronic devices installed in a vehicle have been increased significantly in their number and variety along with recent digitalization of vehicle parts. Generally, electronic devices may be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

Meanwhile, the telematics system and the infotainment system, as most enhanced safety systems of a vehicle do, require higher transmission rates and system expandability. However, the CAN, FlexRay-based network, or the like may not sufficiently meet such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

Specifically, a vehicle network may comprise a plurality of electronic devices, a plurality of electronic control units (ECUs) for controlling the plurality of electronic devices, and at least one switch for controlling communications between the electronic devices and the ECUs. Also, an ECU (also referred to as 'a first ECU') connected to a switch among the plurality of ECUs in the vehicle network may detect link failures in the vehicle network by determining connection status between the plurality of ECUs. Further, the ECU connected to the switch among the plurality of ECUs in the vehicle network may detect link failures by using an algorithm for detecting synchronization errors between the plurality of ECUs and the plurality of electronic devices. In addition, in the vehicle network, the ECU may detect link failures by using an algorithm for detecting frame reception errors between the plurality of ECUs and the plurality of electronic devices.

It is a problem that different algorithms should be provided to the first ECU that detects link failures in the vehicle network in advance for detecting link failures. Accordingly, because a plurality of algorithms for detecting the link failures in the vehicle network are required, there is a problem that load is generated during the operation of the first ECU for detecting the link failures.

SUMMARY

The present disclosure provides operation methods of a communication node for simultaneously detecting link errors such as a synchronization error in a link, and a frame reception error in a link in an Ethernet-based vehicle network.

In accordance with embodiments of the present disclosure, an operation method of a first communication node in an Ethernet-based vehicle network may be provided. The operation method may comprise identifying a link status between the first communication node and each of a plurality of communication nodes included in the vehicle network; receiving a first frame from a second communication node whose link status is normal among the plurality of communication nodes; identifying a first time difference between a local time of the first communication node and a time stamp of the first frame; and determining a synchronization error between the first communication node and the second communication node based on the first time difference.

The operation method may further comprise, when it is determined that a synchronization error exists between the first communication node and the second communication node based on the first time difference, generating a frame configured to include an indicator for indicating the synchronization error; and transmitting the generated frame to the second communication node.

The operation method may further comprise, when it is determined that a synchronization error does not exist between the first communication node and the second communication node based on the first time difference, identifying a second time difference between a time stamp of a second frame received from a third communication node whose link status is normal among the plurality of communication nodes and the time stamp of the first frame; and determining a synchronization error between the first communication node and the second communication node based on the second time difference.

The operation method may further comprise, when it is determined that a synchronization error exists between the first communication node and the second communication node based on the second time difference, generating a frame configured to include an indicator for indicating the synchronization error determined based on the second time difference; and transmitting the generated frame to the second communication node and the third communication node.

The operation method may further comprise, when it is determined that a synchronization error does not exist between the first communication node and the second communication node based on the second time difference, receiving a plurality of frames from each of the second communication node and the third communication node; and determining a frame reception error based on continuity of sequence numbers of the plurality of frames received from each of the second communication node and the third communication node.

The operation method may further comprise, when it is determined that a frame reception error exists based on the continuity, identifying at least one communication node causing the frame reception error based on the continuity among the second communication node and the third communication node; generating a frame configured to include an indicator for indicating the frame reception error; and transmitting the generated frame to the at least one communication node.

The operation method may further comprise, when it is determined that a frame reception error does not exist based on the continuity, outputting information included in the plurality of frames received from each of the second communication node and the third communication node.

The first communication node may be a switch to which the plurality of communication nodes are connected.

Further, in accordance with embodiments of the present disclosure, a first communication node in an Ethernet-based vehicle network may be provided. The first communication node may comprise a processor; and a memory in which at least one instruction executed by the processor is stored. Also, the at least one instruction may be configured to identify a link status between the first communication node and each of a plurality of communication nodes included in the vehicle network; receive a first frame from a second communication node whose link status is normal among the plurality of communication nodes; identify a first time difference between a local time of the first communication node and a time stamp of the first frame; and determine a synchronization error between the first communication node and the second communication node based on the first time difference.

The at least one instruction may be further configured to generate a frame configured to include an indicator for indicating a synchronization error when it is determined that the synchronization error exists between the first communication node and the second communication node based on the first time difference; and transmit the generated frame to the second communication node.

The at least one instruction may be further configured to identify a second time difference between a time stamp of a second frame received from a third communication node whose link status is normal among the plurality of communication nodes and the time stamp of the first frame, when it is determined that a synchronization error does not exist between the first communication node and the second communication node based on the first time difference; and determine a synchronization error between the first communication node and the second communication node based on the second time difference.

The at least one instruction may be further configured to generate a frame configured to include an indicator for indicating a synchronization error when it is determined that the synchronization error exists between the first communication node and the second communication node based on the second time difference; and transmit the generated frame to the second communication node and the third communication node.

The at least one instruction may be further configured to receive a plurality of frames from each of the second communication node and the third communication node when it is determined that a synchronization error does not exist between the first communication node and the second communication node based on the second time difference; and determine a frame reception error based on continuity of sequence numbers of the plurality of frames received from each of the second communication node and the third communication node.

The at least one instruction may be further configured to identify at least one communication node causing a frame reception error based on the continuity among the second communication node and the third communication node, when it is determined that the frame reception error exists based on the continuity; generate a frame configured to include an indicator for indicating the frame reception error; and transmit the generated frame to the at least one communication node.

The at least one instruction may be further configured to output information included in the plurality of frames received from each of the second communication node and the third communication node, when it is determined that a frame reception error does not exist based on the continuity.

The first communication node may be a switch to which the plurality of communication nodes are connected.

According to embodiments of the present disclosure, link errors such as a synchronization error and a frame reception error in a link may be simultaneously detected in an Ethernet-based vehicle network.

Also, the operation methods according to the present disclosure do not additionally require a plurality of algorithms for detecting link errors, a load of a communication node for detecting link errors can be remarkably reduced.

BRIEF DESCRIPTION OF DRAWINGS

Embodiments of the present disclosure will become more apparent by describing in detail forms of the present disclosure with reference to the accompanying drawings, in which.

Figure 1:
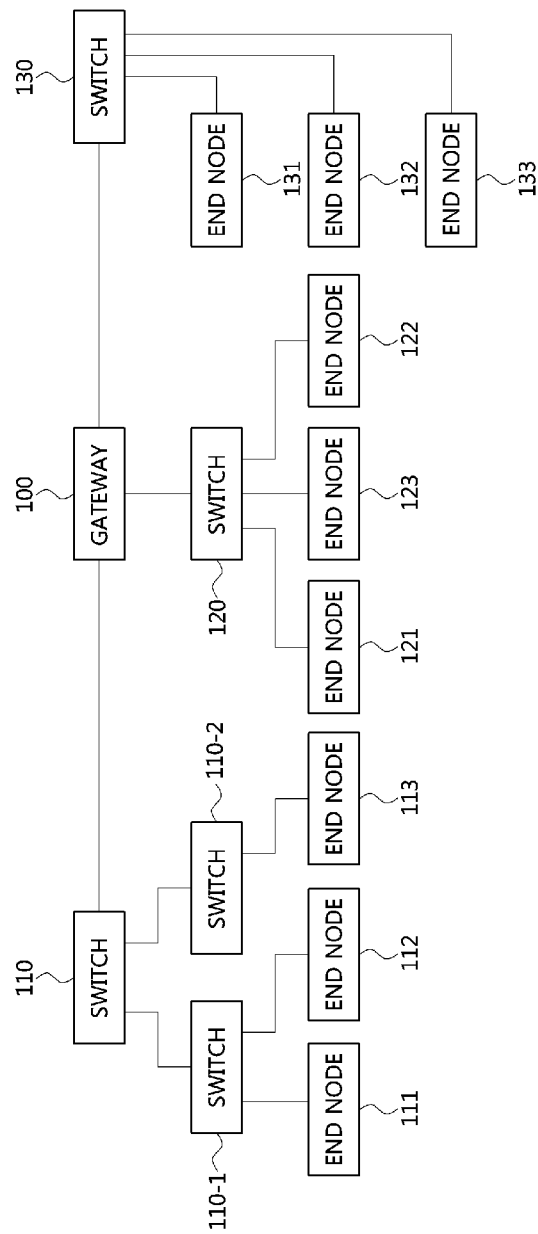
FIG. 1 is a diagram showing a vehicle network topology according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform exemplary processes, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a diagram showing a vehicle network topology according to embodiments of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), or local interconnect network (LIN)) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, and an around view monitoring device).

The communication nodes (e.g., a gateway, a switch, an end node, or the like) included in the vehicle network may be connected in a star topology, a bus topology, a ring topology, a tree topology, a mesh topology, or the like. In addition, the communication nodes of the vehicle network may support the CAN protocol, the FlexRay protocol, the MOST protocol, the LIN protocol, or the Ethernet protocol. Embodiments of the present disclosure may be applied to the foregoing network topologies. The network topology to which forms of the present disclosure may be applied is not limited thereto and may be configured in various ways.

Figure 2:
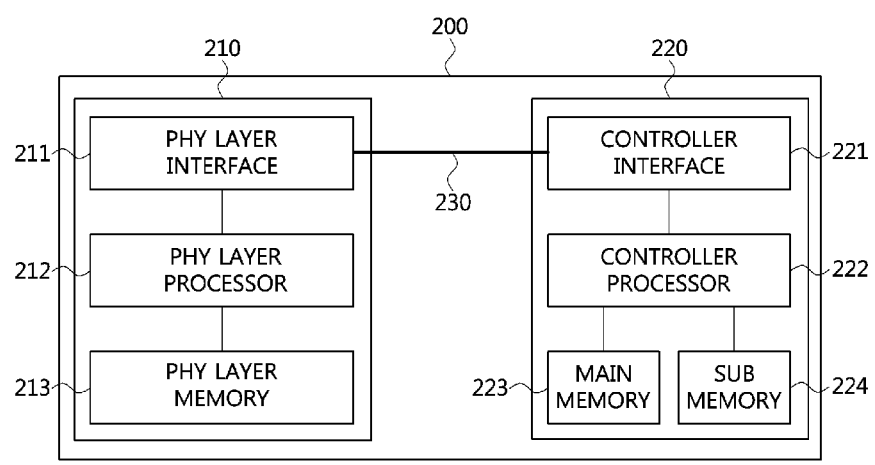
FIG. 2 is a diagram showing a communication node constituting a vehicle network according to embodiments of the present disclosure.

FIG. 2 is a diagram showing a communication node constituting a vehicle network according to embodiments of the present disclosure. Various methods discussed below may be executed by a controller having a processor and a memory.

As shown in FIG. 2, a communication node 200 of a network may include a PHY layer 210 and a controller 220. In addition, the communication node 200 may further include a regulator (not shown) for supplying power. In particular, the controller 220 may be implemented to include a medium access control (MAC) layer. A PHY layer 210 may be configured to receive or transmit signals from or to another communication node. The controller 220 may be configured to control the PHY layer 210 and perform various functions (e.g., an infotainment function, or the like.). The PHY layer 210 and the controller 220 may be implemented as one system on chip (SoC), or alternatively may be implemented as separate chips.

Furthermore, the PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to execute operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and a sub memory 224. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the sub memory 224. The memory control logic may be implemented to be included in the main memory 223 and the sub memory 224 or may be implemented to be included in the controller processor 222.

Furthermore, each of the main memory 223 and the sub memory 224 may be configured to store a signal processed by the controller processor 222 and may be configured to output the stored signal based on a request from the controller processor 222. The main memory 223 may be a volatile memory (e.g., RAM, etc.) configured to temporarily store data required for the operation of the controller processor 222. The sub memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
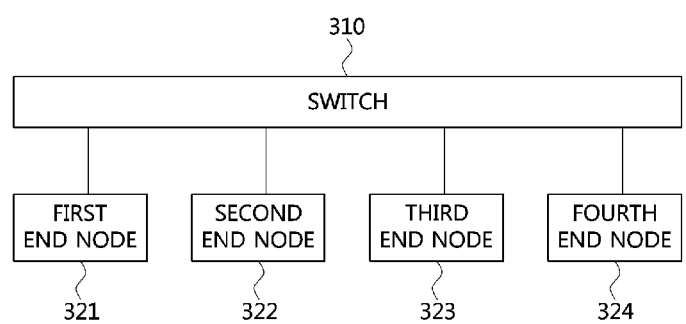
FIG. 3 is a conceptual diagram showing a vehicle network according to an embodiment of the present disclosure.

FIG. 3 is a conceptual diagram showing a vehicle network according to an embodiment of the present disclosure.

A switch 310, a first end node 321, a second end node 322, a third end node 323 and a fourth end node 324 shown in FIG. 3 may constitute an Ethernet-based vehicle network described with reference to FIG. 1. Here, the switch 310 may be an ECU that performs a function of a switch. Each of the switch 310, the first end node 321, the second end node 322, the third end node 323 and the fourth end node 324 may have a structure of the communication node 200 explained by referring to FIG. 2.

In the vehicle network, the switch 310 may be connected to the first end node 321, the second end node 322, the third end node 323 and the fourth end node 324. For example, in the vehicle network, the switch 310, the first end node 321, the second end node 322, the third end node 323, and the fourth end node 324 may communicate with each other by using a time synchronization protocol for Ethernet defined in the IEEE 802.1AS (gPTP) and a protocol defined in the IEEE 1722 standard.

Figure 4:
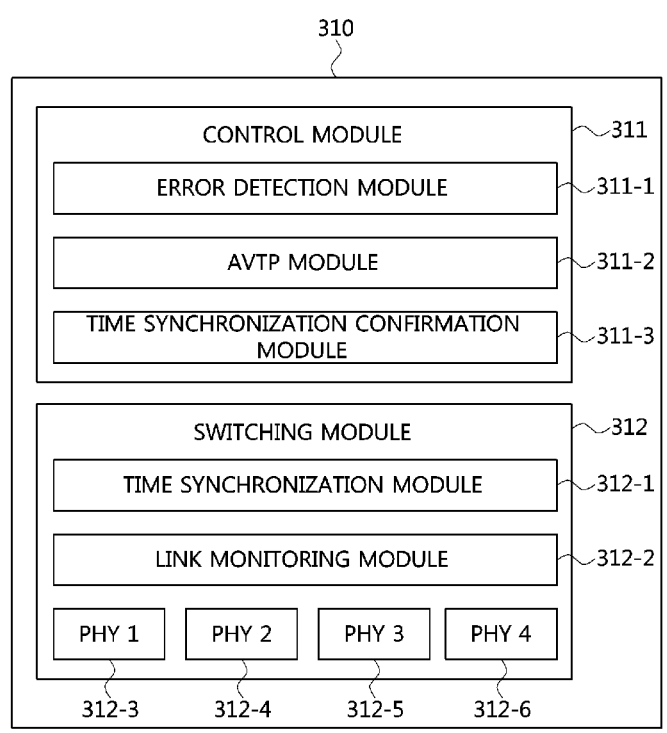
FIG. 4 is a conceptual diagram illustrating a first communication node performing an operation method for detecting a link error in a vehicle network according to an embodiment of the present disclosure.

FIG. 4 is a conceptual diagram illustrating a first communication node performing an operation method for detecting a link error in a vehicle network according to an embodiment of the present disclosure.

Referring to FIG. 4, an operation method of a communication node for detecting a link error in a vehicle network according to an embodiment of the present disclosure may be performed in a first communication node. Here, the first communication node may refer to the switch 310 described with reference to FIG. 3. The switch 310 may include a control module 311 and a switching module 312 to perform an operation method according to an embodiment of the present disclosure.

First, the control module 311 may perform a function for detecting a link error with respect to a plurality of end nodes (for example, a plurality of ECUs) connected to the switch 310 at the switch 310. For this, the control module 311 may include an error detection module 311-1, an audio video transport protocol (AVTP) module 311-2, and a time synchronization confirmation module 311-3.

Specifically, the error detection module 311-1 may perform a function of detecting a link error between the plurality of end nodes connected to the switch 310 and the switch 310. Also, the AVTP module 311-2 may perform a function of supporting communications according to the AVTP protocol. For example, the AVTP module may support communications according to the IEEE 1722 protocol, and may perform a function of detecting a link error with respect to sequence numbers of frames transmitted between the switch 310 and the plurality of end nodes. In addition, the time synchronization confirmation module 311-3 may perform a function of calculating differences between time stamps of frames received from the plurality of end nodes connected to the switch 310.

Meanwhile, the switching module 312 may include a time synchronization module 312-1 and a link monitoring module 312-2 to perform switching functions in the vehicle network. The switching module 312 may also include a first PHY 312-3, a second PHY 312-4, a third PHY 312-5, and a fourth PHY 312-6, each of which means the PHY layer interface described with reference to FIG. 2. Here, the switching module 312 has been described as including four PHYs, but is not limited thereto.

Specifically, the time synchronization module 312-1 may perform a function for time synchronization between the plurality of end nodes connected to the switch 310 and the switch 310. For example, the time synchronization module 312-1 may include a function of generating information for time synchronization between the plurality of end nodes connected to the switch 310 and the switch 310 (e.g., time values for the time synchronization, values required for correcting the time synchronization, etc.). Also, the link monitoring module 312-2 may also perform a function of monitoring link statuses for the plurality of PHYs 312-3, 312-4, 312-5, and 313-6.

The above-described components included in the switch 310 may be not physical components but logical components for performing an operation method for detecting a link error in the vehicle network according to an embodiment of the present disclosure. Also, the functions performed by the plurality of components described above may represent representative functions performed in the respective components. In addition to the functions described, additional functions for link error detection may be performed by the respective components.

Hereinafter, an operation method of the first communication node, which is the switch 310 explained referring to FIGS. 3 and 4, according to an embodiment of the present disclosure will be described.

Figure 5:
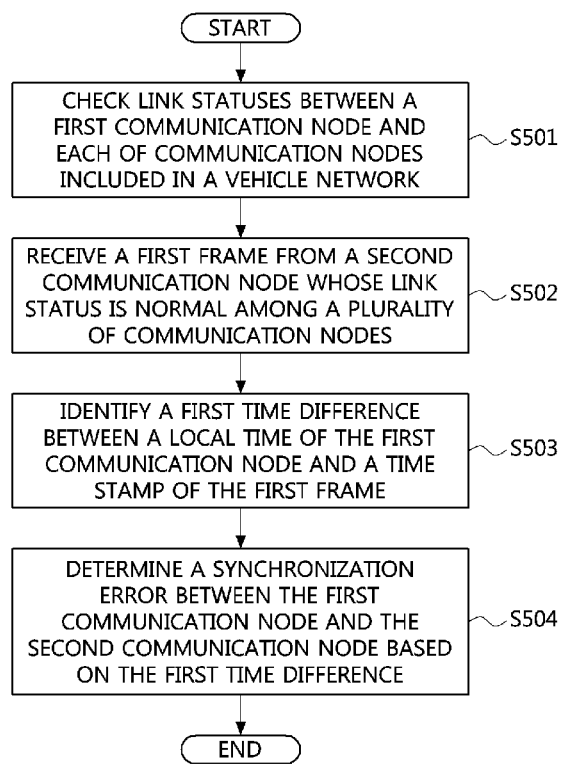
FIG. 5 is a flow chart illustrating an operation method for detecting a link error in a vehicle network according to an embodiment of the present disclosure.

FIG. 5 is a flow chart illustrating an operation method for detecting a link error in a vehicle network according to an embodiment of the present disclosure.

Referring to FIG. 5, an operation method for detecting a link error in a vehicle network according to an embodiment of the present disclosure may be performed in a first communication node. Here, the first communication node may be the switch 310 described with reference to FIGS. 2 and 3. That is, the first communication node may mean a communication node that controls a plurality of communication nodes connected to the first communication node by acting as a switch. The plurality of communication nodes connected to the first communication node may also refer to the end nodes 311 to 314 when the first communication node is the switch 310 described with reference to FIG. 3.

First, in the vehicle network, the first communication node may identify or check link statuses between each of the plurality of communication nodes included in the vehicle network and the first communication node (S501). Specifically, the first communication node may identify the link statuses between each of the plurality of communication nodes and the first communication node by reading values of registers which can be used for checking the link statuses. For example, the first communication node may perform the identification based on whether a network message (NM) is received or not from each of the plurality of communication nodes through Ethernet-based communications.

Thereafter, in a case that there is at least one communication node among the plurality of communication nodes whose link status is abnormal, the first communication node may generate a frame including an indicator indicating a link error. Then, the first communication node may transmit the generated frame to a communication node controlling the first communication node. Here, the communication node controlling the first communication node may be a communication node performing a function of a switch (i.e., another switch to which the first communication node is connected) or a communication node performing a function of a gateway. Also, the first communication node may transmit the generated frame to the plurality of communication nodes.

Further, the first communication node may receive a first frame from a second communication node whose link status is normal among the plurality of communication nodes (S502). Here, the first frame may have a structure for Ethernet-based communications. The structure of the first frame will be specifically described below with reference to FIG. 6.

Figure 6:
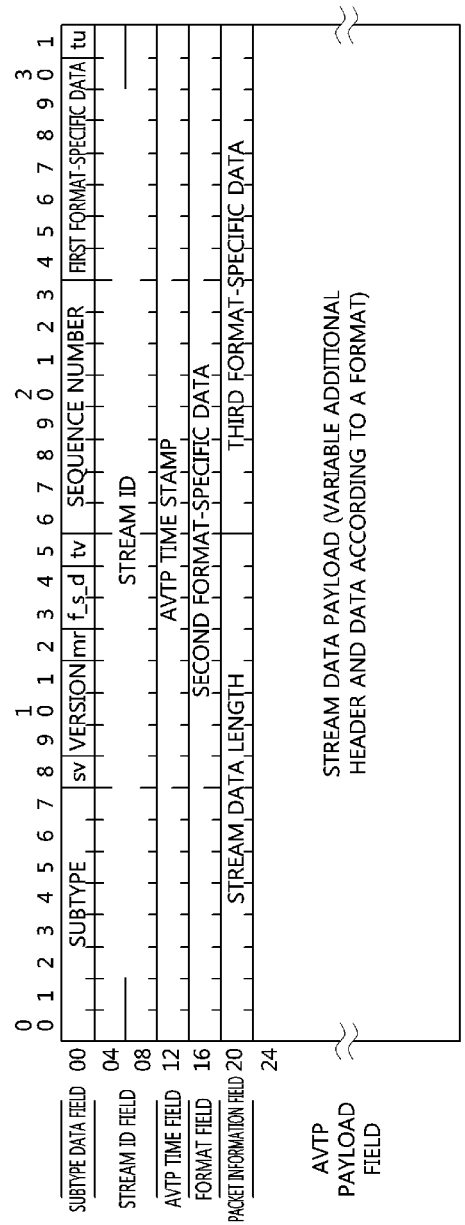
FIG. 6 is a conceptual diagram illustrating a frame transmitted in a vehicle network according to an embodiment of the present disclosure.

FIG. 6 is a conceptual diagram illustrating a frame transmitted in a vehicle network according to an embodiment of the present disclosure.

Referring to FIG. 6, a frame transmitted in a vehicle network according to an embodiment of the present disclosure may comprise a plurality of fields. Specifically, the frame may include a subtype data field, a stream identifier (ID) field, an AVTP time field, a format field, a packet information field, and an AVTP payload field.

First, the subtype data field may have a size of 4 octets and may include a subtype field, an sv field, a version field, an mr field, an f_s_d field, a tv field, a sequence number field, and a first format-specific data field, and a tu field. Here, the subtype field included in the subtype data field may have a size of 8 bits and may be used to identify a protocol subtype according to the used AVTP.

Further, the sv field included in the subtype data field may have a size of 1 bit and may indicate whether a valid stream ID exists in the stream ID field. For example, the value of the sv field may be set to 1 if there is a valid stream ID in the stream ID field. On the contrary, the value of the sv field may be set to 0 if there is no valid stream ID in the stream ID field.

Further, the version field included in the subtype data field may have a size of 3 bits and may indicate a version of an AVTP data unit (AVTPDU). The mr field included in the subtype data field may have a size of 1 bit and may indicate whether or not a media clock of a source has been changed. The f_s_d field included in the subtype data field may have a size of 2 bits.

Further, the tv field included in the subtype data field may have a size of 1 bit, and may indicate validity of a time stamp value in the AVTP timestamp field. For example, the tv field may be set to 1 if there is a valid time stamp value in the AVTP timestamp field. On the contrary, the tv field may be set to 0 if there is no valid time stamp value in the AVTP timestamp field.

Further, the sequence number field included in the subtype data field may have a size of 8 bits, and may indicate a stream sequence of the AVTP data unit. The first format-specific data field included in the subtype data field may have a size of 7 bits. The tu field included in the subtype data field may have a size of 1 bit, and may indicate an error in the AVTP timestamp field.

Meanwhile, the stream ID field may have a size of 8 octets. In the case that the value of the sv field is set to 1, the stream ID field may have a stream ID having a length of 64 bits, which is related to the AVTP data unit. That is, the stream ID having a length of 64 bits may be filled in the stream ID field. Further, the AVTP time field may have a size of 4 octets, and may have an AVTP time stamp value having a length of 32 bits. That is, the AVTP time field may indicate an AVTP time using the AVTP time stamp value having a length of 32 bits, when the tv field is set to 1.

Further, the format field may have a size of 4 octets, and may include second format-specific data having a length of 32 bits. Also, the packet information field may have a size of 4 octets, and include a stream data length field having a length of 16 bits and a third format-specific data field having a length of 16 bits. Also, the AVTP payload field may have a size of 0 to N octets, and have data according to the AVTP. The size of the AVTP payload field may be determined within a range which does not exceed a maximum transmission unit (MTU).

Turning back to FIG. 5, the first communication node may identify a first time difference between a local time of the first communication node and the time stamp of the first frame (S503). Here, the time stamp of the first frame may refer to the value of the time stamp field described with reference to FIG. 6. That is, the first communication node may identify the first time difference, which means a difference between the local time of the first communication node and the time indicated by the time stamp of the first frame. Specifically, the first time difference between the local time of the first communication node and the time indicated by the time stamp of the first frame may be expressed by Equation 1.

$$\text{Time\_difference} = avtp\_\text{timestamp} - (\text{Local Time}_{ns}) \mod 2^{32} \qquad [\text{Equation 1}]$$

In Equation 1, 'avtp_timestamp' may mean the time indicated by the time stamp of the first frame, and 'Local Time$_{ns}$' may mean the local time of the first communication node. Accordingly, in Equation 1, 'Time_difference' may mean the first time difference. Here, the unit of the local time of the first communication node, the time indicated by the time stamp of the first frame, and the first time difference may be nanoseconds (ns).

Then, the first communication node may determine a synchronization error between the first communication node and the second communication node based on the first time difference (S504). Specifically, the first communication node may determine that the synchronization between the first and second communication nodes is abnormal when the first time difference is less than 0 or is equal to or greater than a first threshold value preset for determining the synchronization error. Also, the first communication node may determine that the synchronization is normal when the first time difference is 0 or larger and less than the first threshold value.

Here, the first threshold value may be variably set within 1 to $2^{23}-1$ nanoseconds based on a requirement of an electronic device including the first communication node. For example, it may be assumed that the first communication node is included in a surround view monitoring (SVM) system, and an error allowed for frame reception in the SVM system is at most one second. In such a case, the first threshold value may be preset to 1,000,000,000 ns.

Hereinafter, an operation performed on the basis of the determination result of determining the synchronization error between the first communication node and the second communication node based on the first time difference at the first communication node will be described with reference to FIG. 7.

Figure 7:
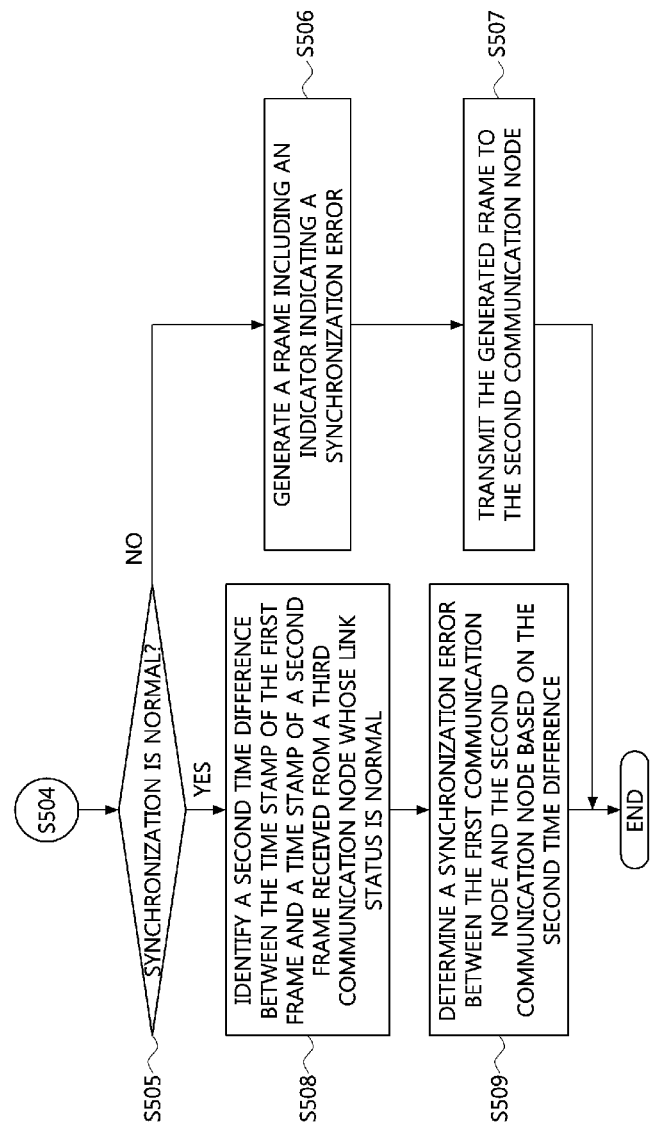
FIG. 7 is a flow chart illustrating a first embodiment of a method of determining a synchronization error in a vehicle network according to an embodiment of the present disclosure.

FIG. 7 is a flow chart illustrating a first embodiment of a method of determining a synchronization error in a vehicle network according to an embodiment of the present disclosure.

Referring to FIG. 7, the first communication node may determine whether the synchronization between the first communication node and the second communication node is normal based on the method described in step S504 (S505). Then, in a case that the synchronization is determined as abnormal based on the first time difference, the first communication node may generate a frame including an indicator for indicating the synchronization error (S506).

Then, the first communication node may transmit the generated frame to the second communication node (S507). Here, the first communication node may transmit the generated frame to not only the second communication node but also a communication node controlling the first communication node. Here, the communication node controlling the first communication node may be a communication node performing a function of a switch (i.e., another switch to which the first communication node is connected) or a communication node performing a function of a gateway. In addition, the first communication node may transmit the generated frame to a plurality of communication nodes.

On the other hand, in a case that the synchronization determined on the basis of the first time difference is normal, the first communication node may identify a second time difference between the time stamp of the first frame and a time stamp of a second frame received from a third communication node whose link status is normal among the plurality of communication nodes (S508). Here, the time stamp of the second frame may refer to a value of the time stamp field in the second frame. That is, the first communication node may identify the second time difference, which is a difference between the time indicated by the time stamp of the first frame and the time indicated by the time stamp of the second frame.

Then, the first communication node may determine a synchronization error between the first communication node and the second communication node based on the second time difference (S509). Specifically, the first communication node may compare the second time difference with a range according to a second threshold value to determine the synchronization error. Here, it is described that the first communication node determines the synchronization error based on the second time difference between the time stamp of the second frame received from the third communication node and the time stamp of the first frame, but various embodiments of the present disclosure may be not limited thereto.

For example, in a case that the first communication node receives a plurality of frames from the second communication node, the third communication node, a fourth communication node, and a fifth communication node whose link status is normal among the plurality of communication nodes, the first communication node may calculate time differences for the time stamps of the received frames. Specifically, the time differences of the time stamps of the plurality of frames may be expressed by Equation 2.

$$\text{Time\_difference}_1 = \text{avtp\_timestamp}_{(ECU2)} - \text{avtp\_timestamp}_{(ECU3)}$$

$$\text{Time\_difference}_2 = \text{avtp\_timestamp}_{(ECU2)} - \text{avtp\_timestamp}_{(ECU4)}$$

$$\text{Time\_difference}_3 = \text{avtp\_timestamp}_{(ECU2)} - \text{avtp\_timestamp}_{(ECU5)}$$

$$\text{Time\_difference}_4 = \text{avtp\_timestamp}_{(ECU3)} - \text{avtp\_timestamp}_{(ECU4)}$$

$$\text{Time\_difference}_5 = \text{avtp\_timestamp}_{(ECU3)} - \text{avtp\_timestamp}_{(ECU5)}$$

$$\text{Time\_difference}_6 = \text{avtp\_timestamp}_{(ECU4)} - \text{avtp\_timestamp}_{(ECU5)} \quad \text{[Equation 2]}$$

In Equation 2, 'ECU2' may denote the second communication node, and 'avtp_timestamp$_{(ECU2)}$' may denote the time indicated by the time stamp of the second communication node. Also, 'ECU3' may denote the third communication node, and 'avtp_timestamp$_{(ECU3)}$' may denote the time indicated by the time stamp of the third communication node. Further, 'ECU4' may denote the fourth communication node, and 'avtp_timestamp$_{(ECU4)}$' may denote the time indicated by the time stamp of the fourth communication node. Also, 'ECU5' may denote the fifth communication node, and 'avtp_timestamp$_{(ECU5)}$' may denote the time indicated by the time stamp of the fifth communication node.

That is, the first communication node may identify the plurality of time differences for the timestamps of the plurality of frames received respectively from the plurality of communication nodes according to the method described above. The first communication node may then determine a synchronization error between the first communication node and the plurality of communication nodes based on the plurality of time differences.

Specifically, the first communication node may compare the plurality of time differences with a range according to the second threshold value. Specifically, when the second threshold value is y, the range according to the second threshold value may be expressed by Equation 3.

$$y \leq \text{Time\_difference}_{1,2,3,4,5,6} \leq y \quad \text{[Equation 3]}$$

The second threshold value, denoted as 'y' in Equation 3, may be variably determined based on the requirement of the electronic device including the first communication node within the range of 1 to $2^{23}-1$ nanoseconds. For example, it may be assumed that the first communication node is included in a SVM system, and an allowed error for frame reception in the SVM system is at most one second. In such a case, the second preset threshold value may be 5,000,000,000 ns. Accordingly, Equation 3 may be expressed as Equation 4 below.

$$-0.5 \text{ s} \leq \text{Time}_{difference_{1,2,3,4,5,6}} \leq 0.5 \text{ s} \quad \text{[Equation 4]}$$

The first communication node may determine that the synchronization is abnormal in a case that the plurality of time differences do not satisfy the range according to the second threshold value. Further, the first communication node may determine that the synchronization is normal in a case that the plurality of time differences satisfy the range according to the second threshold value. According to the above-described method, the first communication node may determine a synchronization error between the first communication node and the second communication node based on the second time difference in the step S507.

Hereinafter, an operation performed on the basis of the determination result of determining the synchronization error between the first communication node and the second communication node based on the second time difference at the first communication node will be described with reference to FIG. 8.

Figure 8:
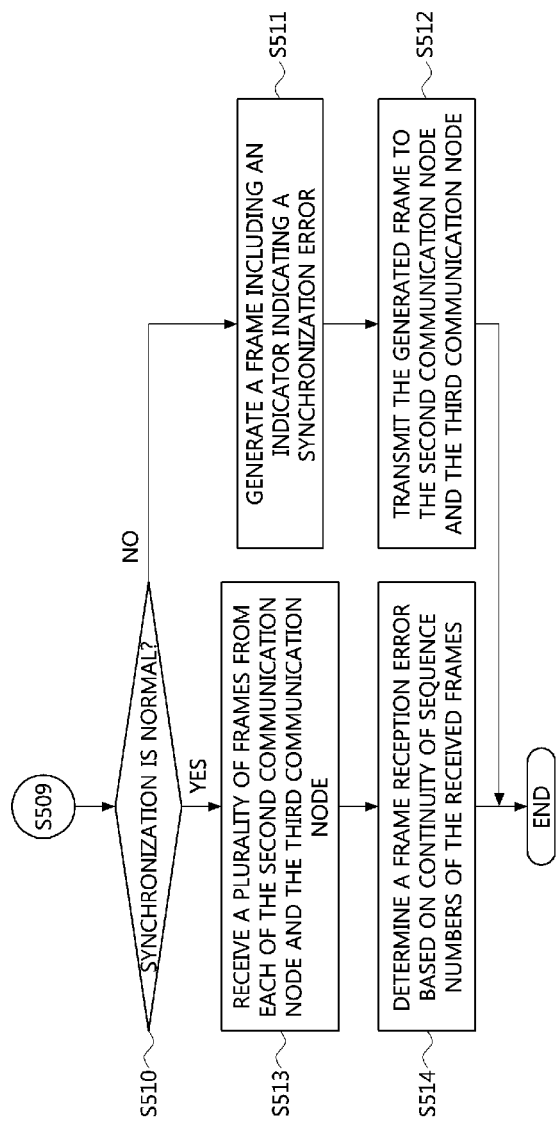
FIG. 8 is a flow chart illustrating a second embodiment of a method of determining a synchronization error in a vehicle network according to an embodiment of the present disclosure.

FIG. 8 is a flow chart illustrating a second embodiment of a method of determining a synchronization error in a vehicle network according to an embodiment of the present disclosure.

Referring to FIG. 8, the first communication node may determine whether the synchronization between the first communication node and the second communication node is normal based on the method described in step S509 (S510). Then, in a case that the determined synchronization based on the second time difference is abnormal, the first communication node may generate a frame including an indicator for indicating the synchronization error (S511).

Then, the first communication node may transmit the generated frame to the second communication node and the third communication node (S512). Here, the first communication node may transmit the generated frame to not only the second communication node and the third communication node but also a communication node controlling the first communication node. Here, the communication node controlling the first communication node may be a communication node performing a function of a switch (e.g., another switch to which the first communication node is connected) or a communication node performing a function of a gateway. In addition, the first communication node may transmit the generated frame to a plurality of communication nodes.

Further, in the case that the synchronization determined based on the second time difference is normal, the first communication node may receive a plurality of frames respectively from the second communication node and the third communication node (S513). That is, the first communication node may receive a plurality of frames from the second communication node, and may receive a plurality of frames from the third communication node.

Then, the first communication node may determine a frame reception error based on continuity of sequence numbers of the plurality of frames (S514). Here, the sequence number may refer to the number indicated by the sequence number field described with reference to FIG. 6. That is, the first communication node may verify the continuity of the numbers represented by the sequence number fields of the plurality of frames received from each of the first communication node and the second communication node, and may determine the frame reception error based on the continuity of the sequence numbers. Here, the frame reception error may mean a loss of at least one frame or an error in the order in which the frames are received.

Specifically, when there is no continuity in the numbers indicated by the sequence number fields of the plurality of frames received from the first communication node and the second communication node, the first communication node may determine that a frame reception error exists in the received plurality of frames. Also, the first communication node may determine that a frame reception error does not exist in the received plurality of frames when there is a continuity of the numbers indicated by the sequence number fields of the plurality of frames received from each of the first communication node and the second communication node.

Hereinafter, an operation performed at the first communication node, on the basis of the determination result of determining the frame reception error based on the continuity of the sequence numbers of the received frames, will be described with reference to FIG. 9.

Figure 9:
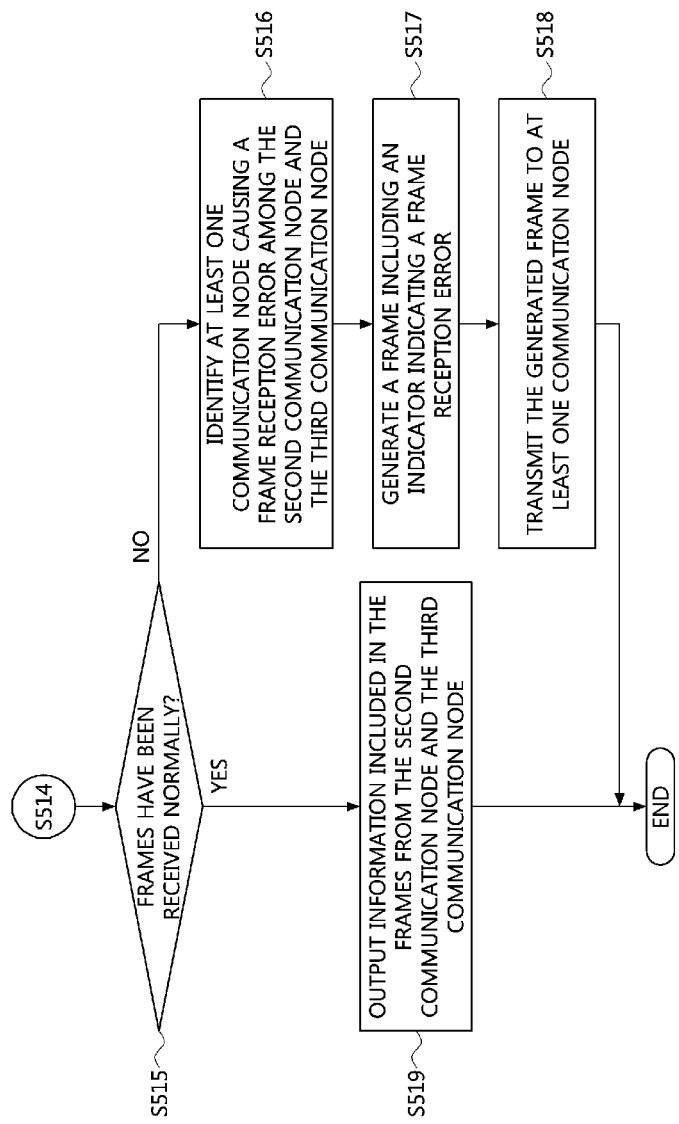
FIG. 9 is a flow chart illustrating a method of determining a frame reception error in a vehicle network according to an embodiment of the present disclosure.

FIG. 9 is a flow chart illustrating a method of determining a frame reception error in a vehicle network according to an embodiment of the present disclosure.

Referring to FIG. 9, the first communication node may determine whether a plurality of frames have been received normally or not based on the method described in step S514 (S515). Then, in the case that a frame reception error is determined to exist in the received frames based on the continuity, the first communication node may identify at least one communication node causing the frame reception error based on the continuity among the second communication node and the third communication node (S516). Thereafter, the first communication node may generate a frame including an indicator for indicating the frame reception error (S517).

Then, the first communication node may transmit the generated frame to the at least one communication node (S518). Here, the first communication node may transmit the generated frame to not only the at least one communication node but also a communication node controlling the first communication node. Here, the communication node controlling the first communication node may be a communication node performing a function of a switch (e.g., another switch to which the first communication node is connected) or a communication node performing a function of a gateway. In addition, the first communication node may transmit the generated frame to a plurality of communication nodes.

On the other hand, in the case that the frames are determined as normal based on the continuity, the first communication node may output information included in the plurality of frames received from the second communication node and the third communication node, respectively (S519).

Through the above-described method, the first communication node in the vehicle network may check link statuses, synchronization errors and frame reception errors for a plurality of communication nodes connected to the first communication node. That is, the first communication node may detect link errors in the vehicle network by performing a method for detecting link errors according to an embodiment of the present disclosure.

Hereinafter, an embodiment in which an operation method of a communication node for detecting link errors in a vehicle network according to an embodiment of the present disclosure is applied will be specifically described with reference to FIGS. 10 and 11.

Figure 10:
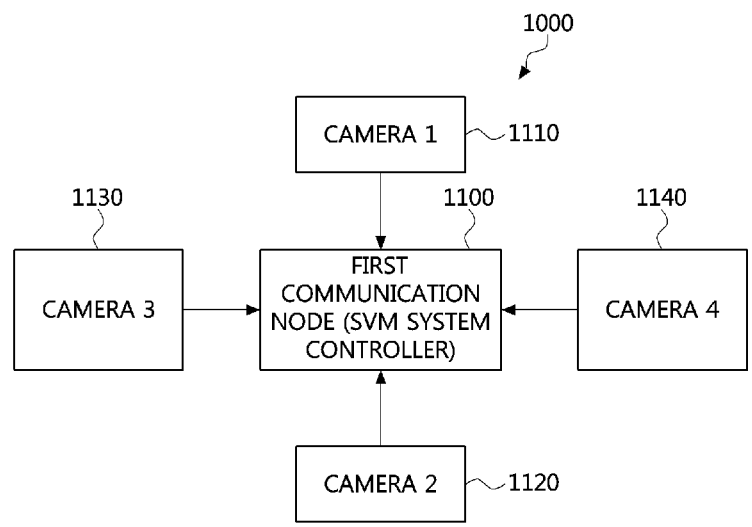
FIG. 10 is a conceptual diagram illustrating a first embodiment of an operation method of a communication node for detecting a link error in a vehicle network according to an embodiment of the present disclosure.

FIG. 10 is a conceptual diagram illustrating a first embodiment of an operation method of a communication node for detecting a link error in a vehicle network according to an embodiment of the present disclosure.

Referring to FIG. 10, an operation method of a communication node for detecting a link error in a vehicle network according to an embodiment of the present disclosure may be applied to a SVM system 1000. Here, the SVM system 1000 may be implemented using a first communication node 1100 that performs an operation method according to an embodiment of the present disclosure described with reference to FIGS. 5 to 9. That is, the SVM system 1000 may comprise a plurality of cameras 1110 to 1140 installed in a vehicle and the first communication node 1100 (i.e., SVM system controller) that controls the plurality of cameras 1110 to 1140 and performs an operation method for detecting a link error according to an embodiment of the present disclosure.

In the vehicle network, the SVM system 1000 may comprise a plurality of cameras. For example, the plurality of cameras may be cameras installed in the vehicle, and include a first camera 1110, a second camera 1120, a third camera 1130, and a fourth camera 1140. Specifically, the first camera 1110 may refer to a front camera installed in a front side of the vehicle. Also, the second camera 1120 may refer to a rear camera installed in a rear side of the vehicle. Also, the third camera 1130 may mean a left camera installed in a left side of the vehicle. Also, the fourth camera may mean a right camera installed in a right side of the vehicle. Here, each of the cameras may correspond to each of other communication nodes connected to the first communication node.

Here, the first camera 1110, the second camera 1120, the third camera 1130, and the fourth camera 1140 may be connected to the first communication node 1100, and the first communication node 1100 may perform time synchronization among the first communication node and the plurality of cameras. Accordingly, in the vehicle network, the first communication node 1100 and the plurality of cameras 1110 to 1140 may be time synchronized. Here, the time synchronization between the first communication node 1100 and each of the plurality of cameras may be performed sequentially or concurrently.

Then, each of the plurality of cameras may generate frames including images obtained through each of the plurality of cameras. Then, the plurality of cameras may transmit the generated frames to the first communication node 1100. Here, the frames transmitted from each of the plurality of cameras may have the same structure as the frame described with reference to FIG. 6.

For example, the first camera 1110 may obtain images of the front side of the vehicle and generate first image frames including the obtained images. Then, the first camera 1110 may transmit the generated first image frames to the first communication node 1100. Also, the second camera 1120 may obtain images of the rear side of the vehicle and generate second image frames including the obtained images. Then, the second camera 1120 may transmit the generated second image frames to the first communication node 1100. Also, the third camera 1130 may obtain images of the left side of the vehicle and generate third image frames including the obtained images. Then, the third camera 1130 may transmit the generated third image frames to the first communication node 1100. Also, the fourth camera 1140 may obtain images of the right side of the vehicle and generate fourth image frames including the obtained images. Then, the fourth camera 1140 may transmit the generated fourth image frames to the first communication node 1100.

The first communication node 1100 may receive the image frames from each of the plurality of cameras. Thereafter, the first communication node 1100 may detect a link error in the vehicle network by performing an operation method for error detection in the vehicle network according to an embodiment of the present disclosure. Specifically, the first communication node 1100 may identify link statuses for the first camera 1110, the second camera 1120, the third camera 1130, and the fourth camera 1140 based on whether or not network messages are received respectively from the first camera 1110, the second camera 1120, the third camera 1130, and the fourth camera 1140.

The first communication node 1100 may check whether a synchronization error exists in the SVM system 1000 based on time stamps of the first image frames received from the first camera 1110, the second image frames received from the second camera 1120, the third image frames received from the third camera 1130, and the fourth image frames received from the fourth camera 1140. A method of determining the synchronization error in the first communication node 1100 may be the same as the method described with reference to FIGS. 5 to 9.

The first communication node 1100 may receive a plurality of image frames from the first camera 1110, the second camera 1120, the third camera 1130 and the fourth camera 1140, respectively. Then, the first communication node 1100 may check the sequence numbers of the plurality of image frames received from the first camera 1110, the second camera 1120, the third camera 1130 and the fourth camera 1140. Then, the first communication node 1100 may determine a frame reception error based on the continuity of the sequence numbers of the plurality of image frames.

Through the above-described methods, the first communication node 1100 may generate a frame including an indicator for indicating an identified error when at least one of a link status error, a synchronization error, and a frame reception error occurs, and transmit the generated frame to the plurality of cameras connected to the first communication node 1100. Further, the first communication node 1100 may transmit the generated frame to not only the plurality of cameras but also to a communication node controlling the first communication node 1100 or the SVM system 1000.

Meanwhile, in the case that the plurality of image frames have been received normally from the plurality of cameras, the first communication node 1100 may obtain the plurality of images included in the received image frames. Then, the first communication node 1100 may output the obtained images through a user interface device installed in the vehicle. For example, in a case that the first communication node 1100 is connected to a display device, the first communication node 1100 may use the obtained images to generate a video or a message for guiding a driver in the vehicle, and output the generated video or message through the display device.

Figure 11:
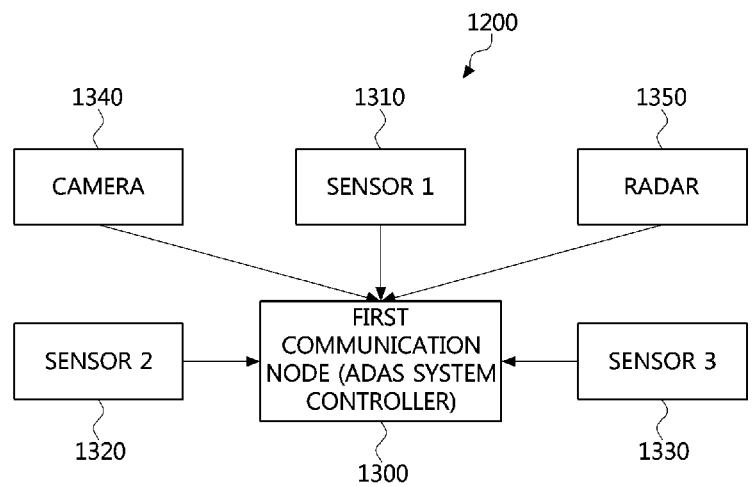
FIG. 11 is a conceptual diagram illustrating a second embodiment of an operation method of a communication node for detecting a link error in a vehicle network according to an embodiment of the present disclosure.

FIG. 11 is a conceptual diagram illustrating a second embodiment of an operation method of a communication node for detecting a link error in a vehicle network according to an embodiment of the present disclosure.

Referring to FIG. 11, an operation method of a communication node for detecting a link error in a vehicle network according to an embodiment of the present disclosure may be applied to an advanced driver assistance system (ADAS) system 1200. Here, the ADAS system 1200 may be implemented using a first communication node 1300 that performs an operation method according to an embodiment of the present disclosure described with reference to FIGS. 5 to 9. That is, the ADAS system 1200 may comprise a plurality of sensors, at least one camera, or at least one radar which will be described later, and the first communication node (i.e., ADAS system controller) that controls them, and performs an operation method for detecting a link error according to an embodiment of the present disclosure.

In the vehicle network, the ADAS system 1200 may comprise a plurality of electronic devices 1310 to 1350. For example, the plurality of electronic devices may include a first sensor 1310, a second sensor 1320, a third sensor 1330, a camera 1340, and a radar 1350. Specifically, the first sensor 1310 may be an infrared sensor installed in a front side of the vehicle, the second sensor 1320 may be a sensor installed in a left side of the vehicle, and the third sensor 1330 may be a sensor installed in a right side of the vehicle. Also, the camera 1340 may be a camera installed in the vehicle, and the radar 1350 may be a radar installed in the vehicle. Also, the ADAS system 1200 may further include an actuator for controlling a power train or a steering wheel of the vehicle, which is not illustrated in FIG. 11. Here, each of the electronic devices may correspond to each of other communication nodes connected to the first communication node.

Here, the first sensor 1310, the second sensor 1320, the third sensor 1330, the camera 1340, and the radar 1350 may be connected to the first communication node 1300, and the first communication node 1300 may perform time synchronization among the first communication node and the plurality of devices 1310 to 1350. Accordingly, in the vehicle network, the first communication node 1300 and the plurality of devices 1310 to 1350 may be time synchronized. Here, the time synchronization between the first communication node 1300 and each of the devices 1310 to 1350 may be performed sequentially or concurrently.

Then, each of the plurality of devices 1310 to 1350 may generate frames including information obtained by performing respective functions. Then, the plurality of devices 1310 to 1350 may transmit the generated frames to the first communication node 1300. Here, the frames transmitted from each of the plurality of devices 1310 to 1350 may have the same structure as the frame described with reference to FIG. 6.

For example, the first sensor 1310 may sense an object approaching the vehicle in front of the vehicle, and may generate a first sensing frame including information on the sensed object. The first sensor 1210 may then transmit the generated first sense frame to the first communication node 1300. Also, the second sensor 1220 may sense an object approaching the vehicle from the left side of the vehicle, and may generate a second sensing frame including information on the sensed object. The second sensor 1320 may then transmit the generated second sensing frame to the first communication node 1300. Also, the third sensor 1330 may sense an object approaching the vehicle from the right side of the vehicle, and may generate a third sensing frame including information on the sensed object. The third sensor 1330 may then transmit the generated third sensing frame to the first communication node 1300.

Also, the camera 1340 may obtain images around the vehicle at a position installed in the vehicle, and may generate image frames including the obtained images. Then, the camera 1240 may transmit the generated image frames to the first communication node 1300. Also, the radar 1350 may detect an object existing in the vicinity of the vehicle at a position installed in the vehicle, and may generate a radar sensing frame including information on the sensed object. Thereafter, the radar 1250 may transmit the generated radar sensing frame to the first communication node 1300.

Then, the first communication node 1300 may receive the frames from each of the plurality of devices 1310 to 1350. Thereafter, the first communication node 1300 may detect a link error in the vehicle network by performing an operation method for error detection in the vehicle network according to an embodiment of the present disclosure. Specifically, the first communication node 1100 may identify link statuses for the first sensor 1310, the second sensor 1320, the third sensor 1330, the camera 1340, and the radar 1350 based on whether or not network messages are received respectively from the first sensor 1310, the second sensor 1320, the third sensor 1330, the camera 1340, and the radar 1350.

Then, the first communication node 1300 may determine whether a synchronization error exists in the ADAS system 1200 based on time stamps of the first sensing frame received from the first sensor 1310, the second sensing frame received from the second sensor 1320, the third sending frame received from the third sensor 1330, the image frames received from the camera 1340, and the radar sensing frame received from the radar 1350. A method of determining the synchronization error in the first communication node 1300 may be the same as the method described with reference to FIGS. 5 to 9.

Then, the first communication node 1300 may receive a plurality of frames from the first sensor 1310, the second sensor 1320, the third sensor 1330, the camera 1340, and the radar 1350, respectively. Then, the first communication node 1300 may check the sequence numbers of the plurality of frames received from the first sensor 1310, the second sensor 1320, the third sensor 1330, the camera 1340, and the radar 1350. Then, the first communication node 1300 may determine a frame reception error based on the continuity of the sequence numbers of the plurality of frames.

Through the above-described methods, the first communication node 1300 may generate a frame including an indicator for indicating an identified error when at least one of a link status error, a synchronization error, and a frame reception error occurs, and transmit the generated frame to the plurality of devices 1310 to 1350 connected to the first communication node 1300. Further, the first communication node 1300 may transmit the generated frame to not only the plurality of devices 1310 to 1350 but also to a communication node controlling the first communication node 1100 or the ADAS system 1200.

Meanwhile, in the case that the plurality of frames have been received normally from the plurality of devices 1310 to 1350, the first communication node 1300 may obtain the information included in the received frames. Then, the first communication node 1300 may output the obtained information through a user interface device installed in the vehicle. For example, in a case that the first communication node 1300 is connected to a display device, the first communication node 1300 may use the obtained information to generate a video or a message for guiding a driver in the vehicle, and output the generated video or message through the display device.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first communication node in an Ethernet-based vehicle network, comprising:
   identifying whether a link status between the first communication node and each of a plurality of communication nodes included in the vehicle network is a normal state or an abnormal state;
   receiving a first frame from a second communication node whose link status is the normal state among the plurality of communication nodes based on the identified link status;
   identifying a first time difference between a local time of the first communication node and a time stamp of the first frame; and
   determining a synchronization error between the first communication node and the second communication node based on the first time difference,
   when it is determined that the synchronization error does not exist between the first communication node and the second communication node, receiving a plurality of frames from the second communication node; and determining a frame reception error based on continuity of sequence numbers of the plurality of frames received from the second communication node.

2. The operation method according to claim 1, further comprising:

when it is determined that the synchronization error does not exist between the first communication node and the second communication node based on the first time difference, identifying a second time difference between the time stamp of the first frame and a time stamp of a second frame, received from a third communication node whose link status is the normal state among the plurality of communication nodes; and determining a synchronization error between the second communication node and the third communication node based on the second time difference.

3. The operation method according to claim 2, further comprising:

when it is determined that the synchronization error exists between the second communication node and the third communication node based on the second time difference, generating a frame configured to include an indicator for indicating the synchronization error determined based on the second time difference; and transmitting the generated frame to the second communication node and the third communication node.

4. The operation method according to claim 2, further comprising:

when it is determined that the synchronization error does not exist between the second communication node and the third communication node based on the second time difference, receiving a plurality of frames from the third communication node; and determining a frame reception error based on continuity of sequence numbers of the plurality of frames received from the third communication node.

5. The operation method according to claim 4, further comprising:

when it is determined that the frame reception error exists in the plurality of frames received from the second communication node or the third communication node, identifying at least one communication node causing the frame reception error among the second communication node and the third communication node;

generating a frame configured to include an indicator for indicating the frame reception error; and transmitting the generated frame to the at least one communication node.

6. The operation method according to claim 4, further comprising:

when it is determined that the frame reception error does not exist in the plurality of frames received from the second communication node and the third communication node, outputting information included in the plurality of frames received from each of the second communication node and the third communication node.

7. The operation method according to claim 1, wherein the first communication node is a switch to which the plurality of communication nodes are connected.

8. A first communication node in an Ethernet-based vehicle network, comprising:

a processor; and a memory in which at least one instruction executed by the processor is stored, wherein the at least one instruction includes:

identify whether a link status between the first communication node and each of a plurality of communication nodes included in the vehicle network is a normal state or an abnormal state;

receive a first frame from a second communication node whose link status is the normal state among the plurality of communication nodes based on the identified link status;

identify a first time difference between a local time of the first communication node and a time stamp of the first frame;

determine a synchronization error between the first communication node and the second communication node based on the first time difference;

when it is determined that the synchronization error does not exist between the first communication node and the second communication node, receive a plurality of frames from the second communication node; and determine a frame reception error based on continuity of sequence numbers of the plurality of frames received from the second communication node.

9. The first communication node according to claim 8, wherein the at least one instruction further includes:

when it is determined that the synchronization error does not exist between the first communication node and the second communication node based on the first time difference, identify a second time difference between a time stamp of a second frame received from a third communication node whose link status is the normal state among the plurality of communication nodes and the time stamp of the first frame; and determine a synchronization error between the second communication node and the third communication node based on the second time difference.

10. The first communication node according to claim 9, wherein the at least one instruction further includes:

when it is determined that the synchronization error exists between the second communication node and the third communication node based on the second time difference, generate a frame configured to include an indicator for indicating the synchronization error determined based on the second time difference; and transmit the generated frame to the second communication node and the third communication node.

11. The first communication node according to claim 9, wherein the at least one instruction further includes:

when it is determined that the synchronization error does not exist between the second communication node and the third communication node based on the second time difference, receive a plurality of frames from the third communication node; and determine a frame reception error based on continuity of sequence numbers of the plurality of frames received from the third communication node.

12. The first communication node according to claim 11, wherein the at least one instruction further includes:

when it is determined that the frame reception error exists in the plurality of frames received from the second communication node or the third communication node, identify at least one communication node causing the frame reception error based on the continuity among the second communication node and the third communication node;

generate a frame configured to include an indicator for indicating the frame reception error; and transmit the generated frame to the at least one communication node.

13. The first communication node according to claim 11, wherein the at least one instruction further includes:
when it is determined that the frame reception error does not exist in the plurality of frames received from the second communication node and the third communication node, output information included in the plurality of frames received from each of the second communication node and the third communication node.

14. The first communication node according to claim 8, wherein the first communication node is a switch to which the plurality of communication nodes are connected.

* * * * *